C. H. STARBIRD.
AUTOMATIC CABLE GRIP.
APPLICATION FILED MAR. 7, 1908.

906,573.

Patented Dec. 15, 1908.

2 SHEETS—SHEET 1.

Witnesses
Chas. R. Griesbauer.
L. O. Little.

Inventor
C. H. Starbird
By Watson E. Coleman
Attorney

C. H. STARBIRD.
AUTOMATIC CABLE GRIP.
APPLICATION FILED MAR. 7, 1908.

906,573.

Patented Dec. 15, 1908.
2 SHEETS—SHEET 2.

Witnesses
Chas. L. Griesbauer.
L. O. Little.

Inventor
C. H. Starbird
By Watson E. Coleman
Attorney

UNITED STATES PATENT OFFICE.

CHARLES H. STARBIRD, OF EUREKA, CALIFORNIA.

AUTOMATIC CABLE-GRIP.

No. 906,573.  Specification of Letters Patent.  Patented Dec. 15, 1908.

Application filed March 7, 1908. Serial No. 419,716.

*To all whom it may concern:*

Be it known that I, CHARLES H. STARBIRD, a citizen of the United States, residing at Eureka, in the county of Humboldt and State of California, have invented certain new and useful Improvements in Automatic Cable-Grips, of which the following is a specification, reference being had to the accompanying drawings.

My invention relates to improvements in automatic cable grips, and it consists of the novel features of construction and the combination and arrangement of parts hereinafter fully described and claimed.

The object of the invention is to provide a gripping device for a moving cable which will be automatically locked and unlocked according to whether the tension of the cable is ahead of the load or behind it.

The invention may be put to various uses but it is especially adapted for use in logging operations in which the logs, after being felled and sawed, are drawn to a railroad landing by means of a moving endless wire cable operated by a stationary engine at the landing. When logging operations of this description are carried on in mountainous districts where the logs travel down steep inclines, it frequently happens that the load of logs runs ahead of the tension of the cable thus throwing the tension to the rear of the load, in which case, the momentum of the load is so great that unless the grip automatically releases its hold there is danger of the cable being cut or mangled. My improved grip will automatically release the cable should the load move faster than the latter and automatically reëngage the cable when it moves faster than the load.

Figure 1:
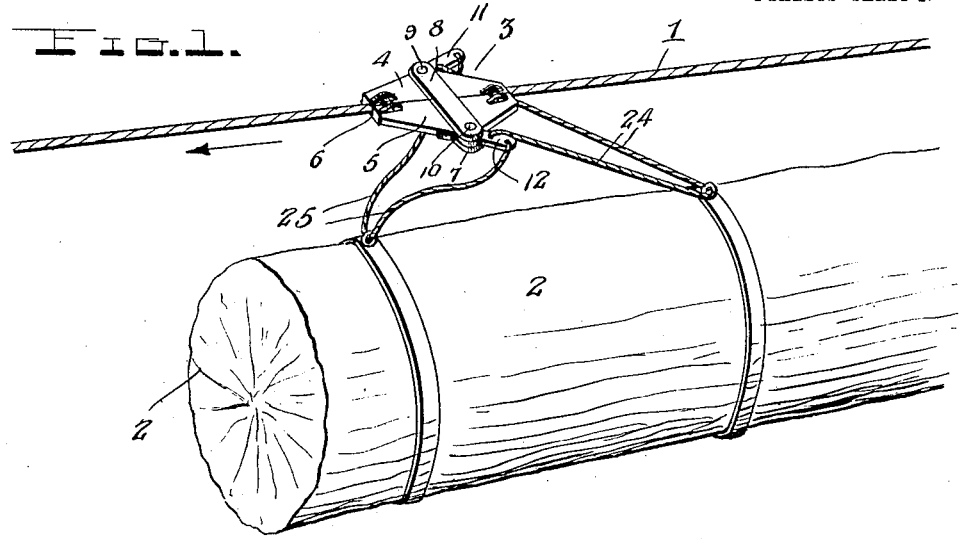
Figure 2:
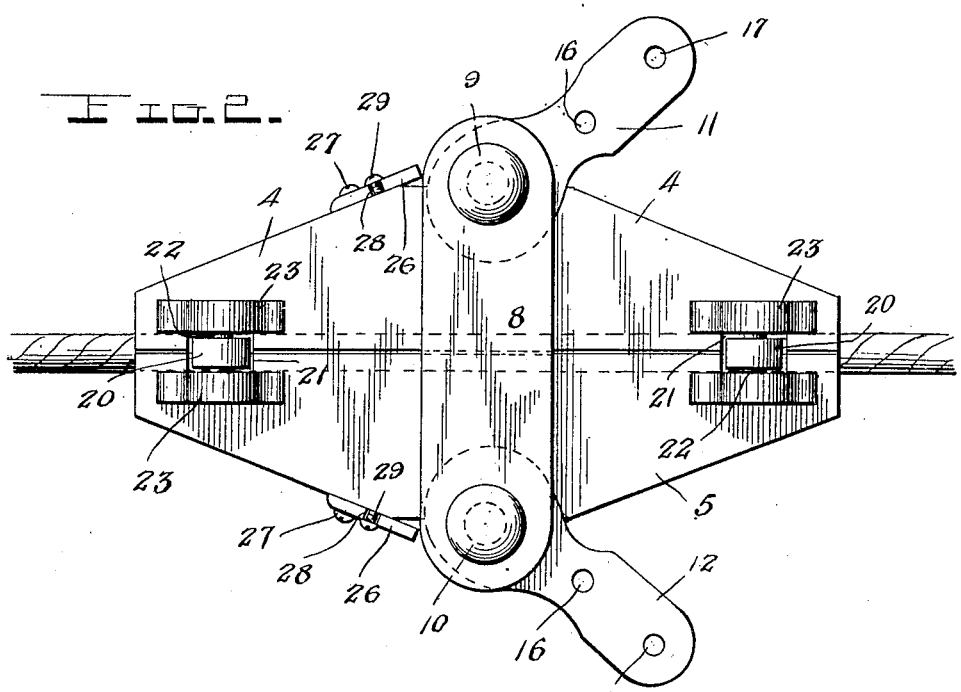
Figure 3:
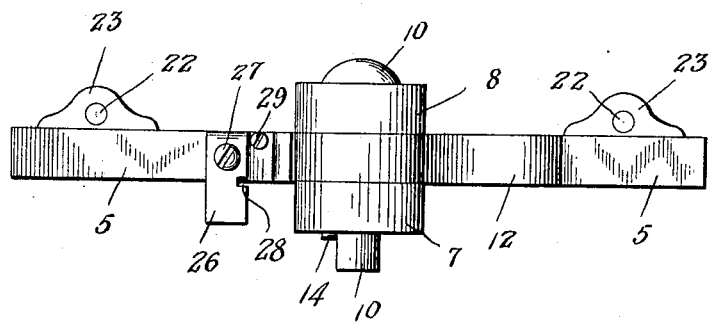
Figure 4:
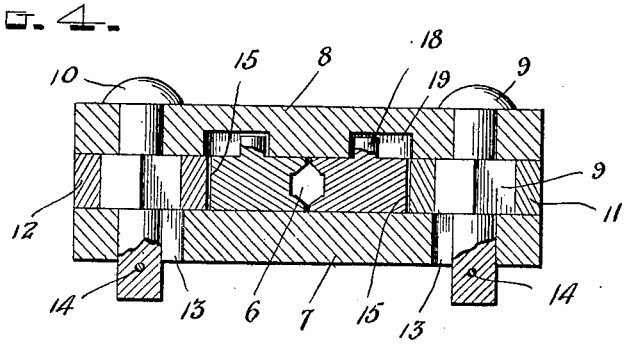
Figure 5:
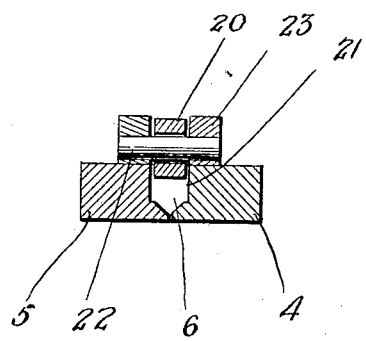

The above and other objects of the invention are attained in its preferred embodiment illustrated in the accompanying drawings, in which Figure 1 is a view illustrating the use of the gripping device; Fig. 2 is a plan view of the device; Fig. 3 is an edge view of the same; and Figs. 4 and 5 are transverse sectional views.

In the drawings 1 denotes a moving cable or the like, 2 denotes a log or other load, and 3 my improved automatic gripping device for connecting the load to the cable. The device 3 comprises two similar jaw members 4, 5 which are movable toward and from each other and are adapted to receive the cable 1 between their longitudinally grooved inner edges 6. The jaw members 4, 5 are movable toward and from each other in a combined guide and support consisting of two cross pieces or plates 7, 8, arranged upon the opposite side faces of the jaw members midway their ends and united by transverse pivots 9, 10. Said pivots 9, 10 project through and rotate in bearing openings formed in the ends of the connecting plates or members 7, 8 and fixed upon their squared central portions are cam or eccentric levers 11, 12 which actuate the jaw members 4, 5. The pivots 9, 10 have heads on one end to engage the outer face of the connecting plate 8 and adjacent to their opposite ends are projecting pins or lugs 14 which engage the outer face of the other connecting plate 7. The walls of the pivot openings in the plate 7 are formed with longitudinal grooves 13 through which the pins 14 may be passed when it is desired to apply or remove the plate 7. The levers 11, 12 have eccentric or cam shaped inner ends which extend into curved seats 15 formed in the outer edges of the jaw members 4, 5, and in the outer or free ends of said levers are formed apertures 16, 17, the latter being adjacent to the extremities of said levers and the former a suitable distance from their pivots 9, 10, as clearly shown in Fig. 2. The jaw members are guided in their sliding movement toward and from each other and prevented from moving longitudinally, by pins or studs 18 which project from said jaw members and into elongated recesses or seats 19 formed in the inner face of the connecting plate 8. For the purpose of reducing friction when the device slides upon the cable, I provide, adjacent to the ends of the device, anti-friction rollers 20 arranged in recesses 21 formed in the jaw members. Said rollers are adapted to engage the cable and are mounted for rotation upon transverse pins 22 slidable in bearings 23 upon the jaw members.

24, 25 denote two cables, chains, or other flexible elements that connect the eccentric levers 11, 12 to the load 2 at points in rear of and in front of the gripping jaws. The connection 24 has its central portion suitably attached to the load and its ends secured in the inner openings 16 in the levers 11, 12 while the other connection 25 has its central portion connected to the load and its ends secured in the outer openings 17 in said levers. The connections 24, 25 extend in opposite directions, the former rearwardly and the latter forwardly when the device is used as shown in Fig. 1 and the cable moves in the direction indicated by the arrow. When the parts are in this position the levers 11, 12 are inclined rearwardly and outwardly so that their eccentric portions force the jaw members 4, 5 together to firmly grip the cable 1, and the connection 4 is taut, since the strain of the load is upon it. When the load moves faster than the cable 1, as it might in descending a steep grade or incline, it causes the connection 25 to swing the levers 11, 12 in a forward direction so that their eccentric portions unlock the jaw members 4, 5 so that the grip can move longitudinally on the cable. As soon as the load stops the connection 24 will be drawn taut to swing the levers to their rearwardly inclined positions and thereby relock the grip to the cable. For the purpose of locking the cam levers against movement I may provide swinging dogs 26 which are pivoted at 27 on the outer edges of the jaw members 4, 5 and have notches 28 to engage clamping screws 29, also upon said edges of the jaw members, as clearly shown in Fig. 3.

The construction, operation, and advantages of the invention will be readily understood from the foregoing description taken in connection with the accompanying drawings and the following brief statement. The device is applied to the cable 1 by removing the connecting member or plate 7 and engaging the grooves 6 in the inner opposing faces of said jaw members with the opposite sides of the cable. To remove the plate 7 the pins or lugs 14 on the pivots 9, 10 must be turned to aline with the grooves 13 as will be readily understood. After the device has been thus applied to the cable, the ropes or connections 24, 25 are suitably attached to the load at points in rear of and in front of the device, said points being so disposed that when one of the connections is taut the other will be slack. As the cable moves in the direction indicated by the arrow in Fig. 1, the load will be moved with it owing to the connection 24 swinging the levers 11, 12 rearwardly to cause their eccentric portions to actuate the jaw members to a gripping position. Should the load in descending a steep incline move faster than the cable the tension will be thrown from the rear to the front and the connection 25 will become taut and will swing the levers in a forward direction to unlock the grip so that the latter can move forwardly upon the cable with the load.

While I have shown and described in detail the preferred embodiment of my invention it will be understood that I do not wish to be limited to the precise construction set forth, and that various changes in the form, proportion, and minor details of construction may be resorted to without departing from the spirit or sacrificing any of the advantages of the invention.

Having thus described my invention what I claim is:

1. The combination with a moving cable and a load, of a cable grip and means connecting the load to the grip for automatically locking and unlocking said grip.

2. The combination with a moving cable and a load, of a cable grip, an operating element for said grip and connections extending from said element to points on the load in front and in rear of the grip, for the purpose specified.

3. In a gripping device of the character described, the combination of a jaw member, a second jaw member movable toward and from the first mentioned one, said members being adapted to receive a moving cable between them, an eccentric or cam lever for actuating the movable jaw, and flexible elements attached to said lever and extending in opposite directions for attachment to a load.

4. In a gripping device of the character described, the combination of jaw members having opposing grooved edges to receive a moving cable between them and having seats in their outer edges, connecting plates or members on opposite sides of said jaw members, eccentric or cam levers pivoted between said plates and adapted to engage the seats in said jaw members, and flexible load connections extending in opposite directions and having their ends connected to said levers, substantially as and for the purpose set forth.

5. In a gripping device of the character described, the combination of jaw members having opposing grooved edges to receive a moving cable between them and having seats in their outer edges, connecting plates or members on opposite sides of said jaw members, eccentric or cam levers pivoted between said plates and adapted to engage the seats in said jaw members, flexible load connections extending in opposite directions and having their ends connected to said levers, pin and groove connections between said jaw members and said connecting plates, bearings upon said jaw members, pins in said bearings and anti-friction rollers upon said pins and adapted to engage the cable between said jaw members.

6. In a gripping device of the character described, jaw members movable toward and from each other and adapted to grip a moving cable, means for guiding said members in their movement, eccentrics for actuating said jaw members and flexible load connections extending in opposite directions and having their ends attached to said eccentrics.

7. In a cable gripping device, the combination of jaw members slidable toward and from each other, means for actuating said members, apertured lugs upon said members, pins slidable in said lugs, and anti-friction rollers upon said pins and adapted to engage a cable between said jaw members.

8. In a cable gripping device, the combination of jaw members, one movable toward and from the other, an eccentric for actuating said movable member, a catch pivoted upon said movable member for engagement with the eccentric and means for securing said catch in an operative position.

9. The combination with a moving member and a load, of means for locking the load to the member and means for automatically unlocking the load from the member when the load moves faster than the member in descending an incline, substantially as set forth.

10. The combination with a moving member and a load, of an automatic gripping device between the member and the load, said gripping device being closed when the tension of the member is ahead of the load and open when the tension of the member is in rear of the load, substantially as set forth.

11. The combination with a moving cable and a load, of a gripping device on the cable for connecting the load thereto, and means controlled by the tension of the cable for automatically closing and opening said gripping device, substantially as set forth.

12. The combination with a moving cable and a load, of a gripping device on the cable for connecting the load thereto, and means for opening the gripping device when the load moves faster than the cable, substantially as set forth.

13. The combination with a moving cable and a load, of a gripping device on the cable for connecting the load thereto, means for opening the gripping device when the load moves faster than the cable and means for reclosing the gripping device when the cable moves faster than the load, substantially as set forth.

14. In a gripping device, jaw members movable toward and from each other and adapted to grip a moving cable, actuating members for said jaw members and load connections attached to said actuating members and extending in opposite directions.

15. In a cable gripping device, the combination of jaw members to receive a cable between them and adapted to travel thereon, one jaw member being movable toward and from the other, and anti-friction rollers arranged between said jaw members and adapted to engage and run upon the cable to support the jaw members thereon when the grip is open.

16. In a gripping device of the character described, jaw members to receive a cable between them and movable toward and from each other, means for guiding said jaw members, cam levers for actuating the jaw members and load connections connected to said levers at points unequally distant from their pivots, said load connections extending in opposite directions, substantially as and for the purpose set forth.

In testimony whereof I hereunto affix my signature in the presence of two witnesses.

CHARLES H. STARBIRD.

Witnesses:
　WILLIAM H. BRIGGS,
　GEORGE F. HILL.